(12) United States Patent
Wu et al.

(10) Patent No.: US 11,168,759 B2
(45) Date of Patent: *Nov. 9, 2021

(54) FABRIC FOR TOOTHED POWER TRANSMISSION BELT AND BELT

(71) Applicant: Gates Corporation, Denver, CO (US)

(72) Inventors: Shawn Xiang Wu, Rochester Hills, MI (US); Clifford Walker, Dumfries (GB); Kevin Ward, Dumfries (GB)

(73) Assignee: Gates Corporation, Denver, CO (US)

( * ) Notice: Subject to any disclaimer, the term of this patent is extended or adjusted under 35 U.S.C. 154(b) by 489 days.

This patent is subject to a terminal disclaimer.

(21) Appl. No.: 16/005,291

(22) Filed: Jun. 11, 2018

(65) Prior Publication Data
US 2019/0376579 A1 Dec. 12, 2019
US 2021/0199176 A9 Jul. 1, 2021

Related U.S. Application Data

(63) Continuation of application No. 12/830,077, filed on Jul. 2, 2010, now Pat. No. 10,018,247.

(60) Provisional application No. 61/222,645, filed on Jul. 2, 2009.

(51) Int. Cl.
*F16G 1/10* (2006.01)
*F16G 1/28* (2006.01)
*D02G 3/32* (2006.01)
*D03D 1/00* (2006.01)
*D03D 15/47* (2021.01)
*D03D 15/56* (2021.01)

(52) U.S. Cl.
CPC .............. *F16G 1/10* (2013.01); *D02G 3/32* (2013.01); *D03D 1/0094* (2013.01); *D03D 15/47* (2021.01); *D03D 15/56* (2021.01); *F16G 1/28* (2013.01); *D10B 2331/021* (2013.01); *D10B 2331/04* (2013.01); *D10B 2331/301* (2013.01); *D10B 2401/061* (2013.01); *D10B 2505/02* (2013.01)

(58) Field of Classification Search
CPC .............. F16G 1/10; F16G 1/28; D02G 3/32
See application file for complete search history.

(56) References Cited

U.S. PATENT DOCUMENTS

| | | | | |
|---|---|---|---|---|
| 5,529,545 A * | 6/1996 | Isshiki | ...................... | F16G 1/28 474/205 |
| 5,645,504 A * | 7/1997 | Westhoff | .................... | F16G 1/28 474/250 |
| 6,470,944 B1* | 10/2002 | Billings | ................ | B31F 1/2877 156/462 |
| 10,018,247 B2 * | 7/2018 | Wu | ......................... | D03D 15/00 |
| 2011/0003659 A1* | 1/2011 | Wu | ......................... | D03D 15/08 474/250 |
| 2012/0157251 A1* | 6/2012 | Di Meco | ................... | F16G 1/28 474/91 |

(Continued)

*Primary Examiner* — Michael R Mansen
*Assistant Examiner* — Mark K Buse
(74) *Attorney, Agent, or Firm* — Alyssa K. Sandrowitz, Esq.

(57) ABSTRACT

A fabric for reinforcing a power transmission belt including fibers of polyarylene sulfide and a belt utilizing the fabric. The fabric may have textured or elastic core wrapped stretch yarns in the longitudinal direction. Longitudinal yarns may include PPS and textured transverse yarns include nylon. Yarns may include blends of high performance fibers and nylon or other fibers.

14 Claims, 2 Drawing Sheets

(56) References Cited

U.S. PATENT DOCUMENTS

| | | | |
|---|---|---|---|
| 2012/0192822 A1* | 8/2012 | Rolando | F16G 1/28 123/90.31 |
| 2015/0005123 A1* | 1/2015 | Di Meco | F16G 1/28 474/205 |
| 2017/0023100 A1* | 1/2017 | Di Meco | F16G 1/28 |
| 2017/0159750 A1* | 6/2017 | Newsome | D03D 1/0094 |
| 2017/0299017 A1* | 10/2017 | Gregg | F16G 1/08 |
| 2018/0051772 A1* | 2/2018 | Gregg | F16G 5/08 |
| 2018/0073172 A1* | 3/2018 | Kurahashi | D04B 1/14 |
| 2019/0177889 A1* | 6/2019 | Gao | D03D 13/008 |
| 2019/0178338 A1* | 6/2019 | Gao | D02G 3/447 |
| 2019/0178339 A1* | 6/2019 | Gao | F16G 1/28 |
| 2019/0376579 A1* | 12/2019 | Wu | D03D 1/0094 |

* cited by examiner

FABRIC FOR TOOTHED POWER TRANSMISSION BELT AND BELT

BACKGROUND OF THE INVENTION

Field of the Invention

This invention relates generally to a toothed power transmission belt, more particularly to a toothed belt with a heat and wear resistant fabric for tooth support, and specifically to a toothed belt with tooth support fabric including fibers of poly p-phenylene sulfide.

Description of the Prior Art

Toothed power transmission belts are used in synchronous belt drives. Toothed belts commonly have an elastomeric body with a layer of reinforcing tensile cords which provide high dimensional stability. The body under the cord layer is formed into a series of teeth which mesh in pulleys or sprockets and transmit drive loads to the tensile cord. The teeth are commonly covered with a reinforcing fabric such as a woven stretch fabric of nylon-66 multi-filament yarns. Tooth reinforcing fabrics may be of plain or twill weave or the like. Fabric layers may also be used on the backside of toothed belts, on the backside or pulley contacting profile of multi-v-ribbed belts, or in v-belts or flat belts. Nylon-66 (also known as polyamide-66 or PA-66) fabrics commonly utilize textured or crimped yarns in one direction, as described for example in U.S. Pat. No. 4,826,472 which is hereby incorporated herein by reference, to allow sufficient stretch in the longitudinal direction of the belt to conform to the teeth during a flow-through belt manufacturing process, as described for example in U.S. Pat. No. 3,078,206 which is hereby incorporated herein by reference. Other fabrics utilize elastic core yarns to achieve sufficient stretch in the longitudinal direction, as described for example in U.S. Pat. No. 5,529,545 which is hereby incorporated herein by reference. These yarns will be called hereinafter the "longitudinal yarns" of the belt lengthwise direction, whereas the yarns to be combined with the longitudinal yarns will be called the "transverse yarns". However, these "longitudinal yarns" and "transverse yarns" are not necessarily coincident with the terminology "warp" and "weft", as used to describe the textile structure.

Increased demands on power transmission belts, particularly in the area of automotive under-hood applications, have lead to a number of fabric variations intended to improve the performance of power transmission belts, including for example, use or substitution of para-aramid, meta-aramid, polyetheretherketone (PEEK), polyimide (PI), or polytetrafluoroethylene (PTFE) yarns or fibers in place of some or all of the usual nylon weft yarns or fibers, for example as disclosed in WO 2006-066669. Each proposed variation has limitations, so new fabric alternatives are yet desirable. One problem is that PEEK, aramid, and PTFE are not as easily bonded to elastomer belt body compositions as nylon is, so only limited amounts of substitution for nylon in the weft are practical such as disclosed in WO 2006-066669. Another problem is that para-aramid cannot be textured like nylon, so other means of imparting stretch to some longitudinal yarns must be used, such as combining aramid with elastic yarn as described for example in U.S. Pat. No. 5,529,545. Such combined yarns may suffer from decreased properties. Many such high-performance yarns and fabrics may be limited in use by economic considerations.

What is needed is a stretch fabric for power transmission belts having high heat, fluid, flex, and abrasion resistance, but at a much more reasonable cost than other proposed solutions. What is needed is a fabric which can be processed like conventional nylon-66 stretch fabrics. What is needed is a fabric with good adhesion to elastomeric materials used in belts. The present invention meets one or more of these needs.

SUMMARY

The present invention is directed to systems and methods which provide a power transmission belt with a high heat, fluid, and abrasion resistant reinforcing fabric, for example covering a tooth surface or a belt backside. The present invention also provides a reinforcing fabric for a power transmission belt.

The present invention is directed to a power transmission belt having an elastomeric body, tensile cord reinforcing member, and reinforcing fabric member. The invention is also directed to a reinforcing fabric for a power transmission belt. In one embodiment, the reinforcing fabric member comprises a yarn, thread, or fiber of a polyarylene sulfide material. The fabric may be woven or non-woven fabric. A preferred polyarylene sulfide material is poly(p-phenylene sulfide) ("PPS"). The PPS fiber, thread, or multifilament yarn may replace some or all of the nylon-66 fiber, thread or yarn in the longitudinal yarns of a conventional woven belt fabric. The PPS fiber may be present in the weft or warp yarns of the fabric, but is preferably present at least in the longitudinal yarns of the belt fabric. Preferably the longitudinal yarns containing the PPS are textured to provide stretch in the longitudinal direction. The transverse yarns may be textured. The weft may be the longitudinal direction and the warp the transverse direction.

The belt may be a toothed belt, a flat belt, a v-belt, or multi-v-ribbed belt. The fabric may cover the teeth or other pulley contact surface of the belt, or the fabric may cover the backside or be embedded in the elastomeric belt body.

The fabric may have a transverse yarn including textured nylon-66 fibers or yarns. The fabric may be treated to promote adhesion to the elastomeric body.

By utilizing PPS fibers in the fabric according to the present invention, the fabric is rendered more heat resistant, oil resistant, and wear resistance than conventional nylon-66 fabric. Thus, the invention provides a more durable and heat, fluid and wear resistant belt for a reasonable cost differential.

The present invention is also directed to a power transmission belt having a reinforcing fabric and a reinforcing fabric for a power transmission belt wherein the reinforcing fabric includes longitudinal yarns capable of stretching, preferably at least about 50% or at least about 80%, and transverse yarns having textured multifilament nylon fibers. At least a portion of the longitudinal yarns have nylon fibers and fibers of one or more selected from the group consisting of para-aramid, meta-aramid, polyester, polyketone, polyimide, polyacrylonitrile, polysulfonamide, acrylic, fluoropolymer, and polyarylene sulfide. By utilizing textured nylon fibers in the transverse yarns, adhesion of the fabric to the belt body may be improved and/or penetration of treatments into the fabric may be improved. In various embodiments, the longitudinal stretch yarns may be textured blended yarns of the aforementioned materials, or elastic core yarns wrapped with the aforementioned materials.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
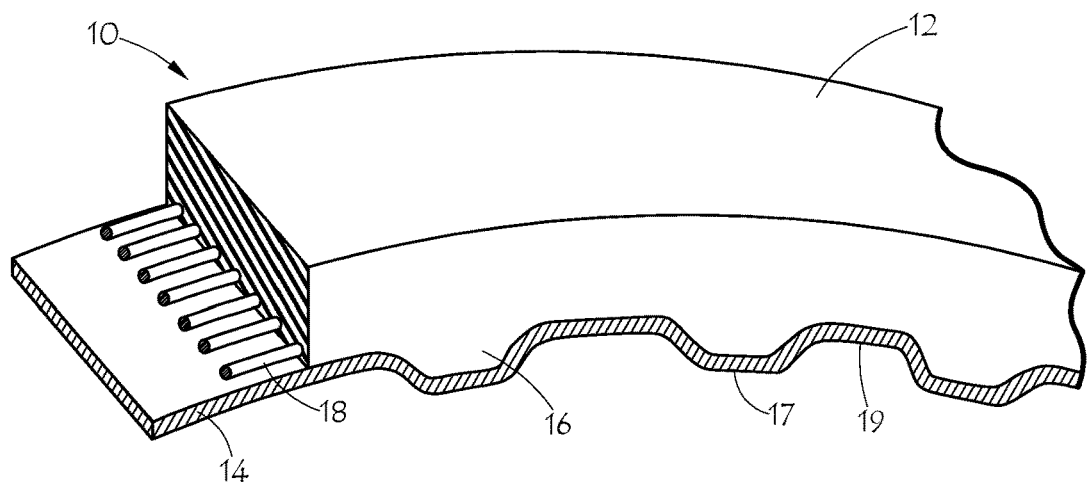
FIG. 1 is a partially fragmented perspective view of a toothed belt constructed in accordance with an embodiment of the present invention.
Figure 2:
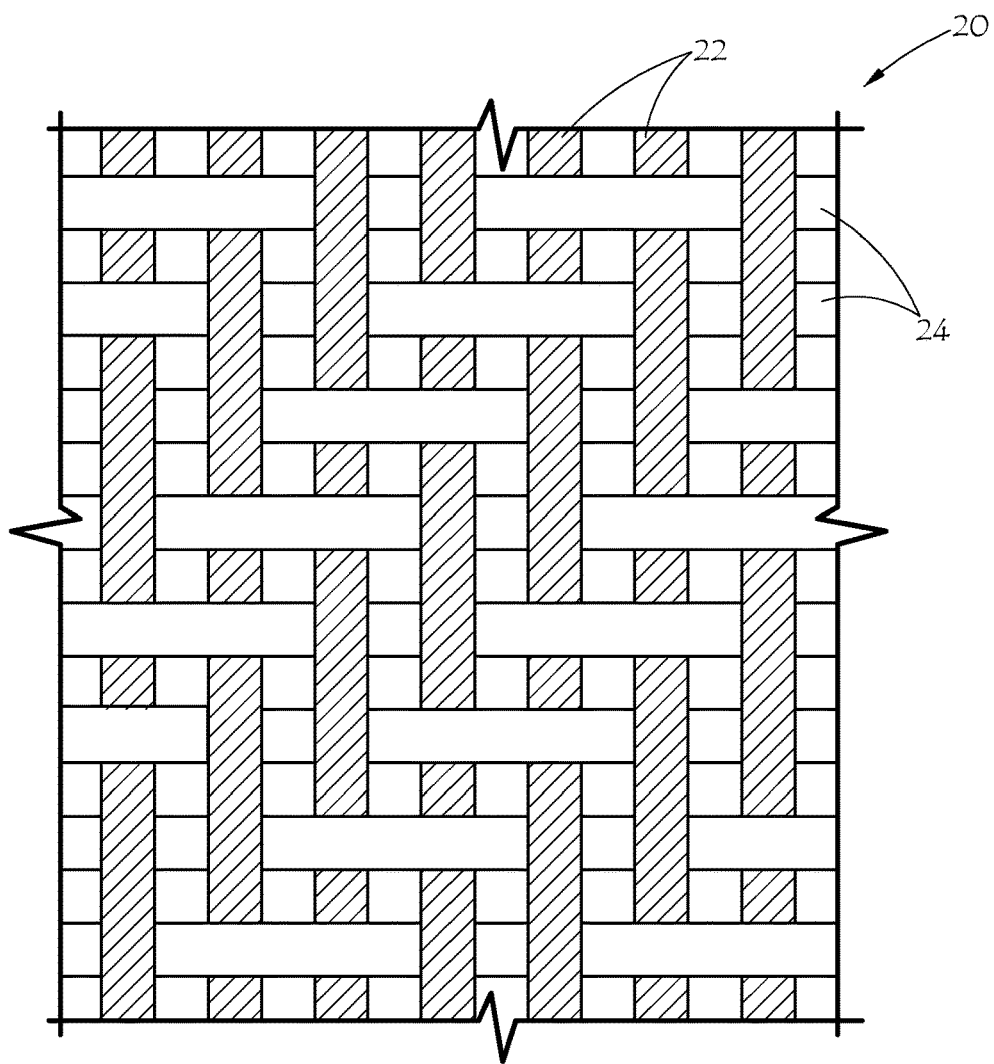
FIG. 2 is a representation of a portion of fabric constructed in accordance with an embodiment of the present invention.

The invention relates to a fabric useful for a power transmission belt and the resulting belt. FIG. 1 shows a partially fragmented perspective view of a toothed belt constructed in accordance with an embodiment of the present invention. In FIG. 1, toothed belt 10 has a elastomeric body which includes elastomeric back 12, elastomeric tooth 16, and embedded tensile member 18. Tooth reinforcement fabric 14 covers tooth portions 17 and land portions 19 and is the pulley contact surface of the toothed belt. According to an embodiment of the invention, fabric 14 comprises fibers of a poly(arylene sulfide) ("PAS") polymer. Preferably the PAS polymer is poly (p-phenylene sulphide) ("PPS"). FIG. 2 shows a 2×2 twill woven fabric according to an embodiment of the present invention. Woven fabric 20 is formed from warp yarns 22 and weft yarns 24. When used as the reinforcement fabric 14 for belt 10, either the warp or weft may be oriented in the longitudinal direction of the belt (i.e. generally parallel to tensile member 18), while the other is oriented in the transverse direction of the belt (i.e. generally perpendicular to tensile member 18). The PAS or PPS fibers may be present in fabric 14 in the longitudinal direction, the transverse direction, or both directions of the belt.

Figure 5:
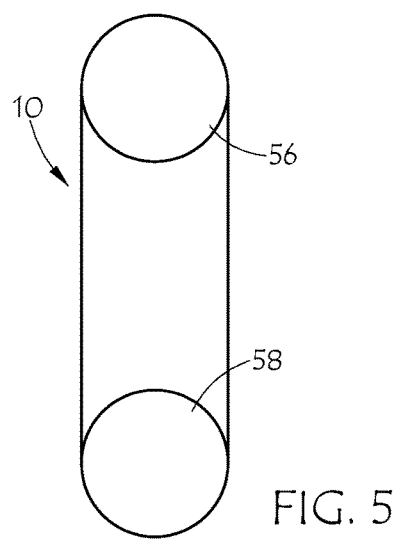
FIG. 5 is a schematic of a belt and pulley system utilizing an embodiment of the present invention.

A belt according to an embodiment of the invention is typically used in a belt drive system, which may include at least a belt, a driver pulley and a driven pulley. FIG. 5 illustrates a belt drive system having belt 10, driver pulley 56 and driven pulley 58.

An embodiment of the present invention is a fabric for reinforcing a power transmission belt comprising fibers of PAS. PAS polymers suitable for fibers for use in practice of the invention may be homopolymers, copolymers, terpolymers and the like or a blend of polymers. Examples of polyarylene sulfide polymers include poly(2,4-toluene sulfide), poly(4,4'-biphenylene sulfide), and poly(p-phenylene sulfide) ("PPS"). Because of its availability and desirable properties, PPS fibers are currently preferred. Suitable PPS fibers include: Sulfar Fiber sold under that trade name by Testori Group; Diofort® multifilament PPS yarn from Diolen Industrial Fibers; and Procon PPS fiber sold under that trade name by Toyobo Co. Ltd. Commercial polyarylene sulfide fiber is believed to be a synthetic fiber in which the fiber-forming material is a long chain synthetic polysulfide in which at least 85% of the sulfide linkages are attached directly to two aromatic rings. PPS may be formed by reaction of sulfur with dichlorobenzene and then extruded by melt spinning to produce staple or filament fibers. PPS is a crystalline polymer having a symmetrical, rigid backbone chain of recurring para-substituted benzene rings and sulfur atoms.

In various embodiments, the fabric may be woven or non-woven fabric. A suitable woven fabric may have warp and weft threads, and at least one of said warp and weft threads includes a multifilament yarn of PAS fibers, or preferably PPS fibers. The fabric may further include nylon-66 fibers. In one embodiment, the fabric has PPS fibers present in the weft, and the warp includes or consists essentially of textured nylon-66. Preferably, for use in a belt, the PPS is present in longitudinal yarns and the transverse yarns include or consist essentially of textured nylon-66. The longitudinal yarns may include both nylon-66 and PPS fibers and may be textured.

In various embodiments, a power transmission belt may be a toothed belt, a flat belt, a v-belt, or multi-v-ribbed belt. The fabric having fibers of PAS, or preferably PPS, may cover teeth or other pulley contact surface of a belt, or the fabric may cover the backside or be embedded in the elastomeric belt body. Various examples of belts and fabrics which may advantageously be adapted by incorporating PAS fiber according to an embodiment of the invention may be mentioned without intending to limit the invention. U.S. Pat. No. 6,793,599, which is hereby incorporated herein by reference, describes V-belts and multi-v-ribbed belts having pulley engaging non-woven regions wherein the non-woven material may include synthetic fiber material. U.S. Pat. No. 5,529,545, incorporated herein by reference, describes toothed belts with stretch fabric for use in a flow-through manufacturing process. Useful embodiments of the fabric of the present invention may also include non-stretch or semi-stretch fabrics for covering the teeth of toothed belts in a pre-form manufacturing process or for covering V-belts or belt backsides where little stretch is needed. Knit fabrics and belts using knit reinforcements as disclosed for example in U.S. Pat. Nos. 5,645,504 and 6,863,761, which are hereby incorporated herein by reference, may be usefully improved according to an embodiment of the present invention.

Typical automotive synchronous or toothed belts use 100% nylon fabric with adhesive coatings as the cover element on the belt teeth. In one embodiment, the present invention relates to a tooth fabric with hybrid construction consisting of nylon fibers and other fibers having greater heat and/or oil resistance and or other high performance characteristic relative to nylon. In certain embodiments of the invention, the other fibers may be of a high performance polymer which may be difficult to bond to elastomeric materials such as utilized in the body of a belt. The heat and/or oil resistant fibers may be incorporated by combining threads or fibers of these materials with nylon or other conventional material within one or more weft or longitudinal yarns of the fabric. Warp or transverse yarns may be 100% nylon, but unlike conventional nylon fabrics, the warp or transverse yarns are textured to provide a higher degree of coverage and penetration by the subsequent RFL or other adhesive coating. Improved penetration of coating into the fabric may provide improved protection against fatigue and/or abrasion.

Thus, another embodiment of the invention is a woven fabric for reinforcing a power transmission belt having longitudinal yarns preferably capable of stretching at least about 80% and transverse yarns having textured multifilament nylon yarn preferably capable of stretching from about 1% to about 20% at 2 kg tension, with at least a portion of the longitudinal yarns including nylon fibers and fibers of one or more high performance materials, which may be relatively hard to bond to elastomers, such as para-aramid, meta-aramid, polyester, polyketone, fluoropolymer, polyimide, polysulfonamide, polyarylene sulfide, acrylic, and the like.

The stretching capability of the woven fabric may be provided by texturing the longitudinal yarns. Texturing is generally a possibility for thermoplastic fibers such as polyester, polyketone, polyarylene sulfide and the like, either separately or along with nylon fibers. Texturing may be achieved by any known texturing method, such as false twisting, crimping, stuffer box, knit-de-knit, air jet, and the like. The elongation of the textured yarn is a way of characterizing the degree of texturing. In particular, the elongation at a specified load, such as 2 kg, may provide a useful measure of the degree of texturing of a yarn. Textured longitudinal yarns for tooth covering fabric for a toothed belt preferably is capable of at least about 50% elongation at 2 kg tension, or at least about 80% elongation at 2 kg tension.

Figure 4:
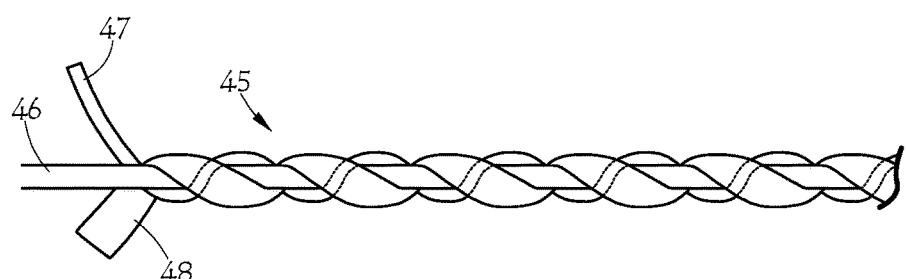
FIG. 4 is a representation of a portion of a stretch yarn utilized in embodiments of the present invention.

Alternately, the stretching capability of the woven fabric may be provided by using for the longitudinal yarns an elastic core thread wrapped with nylon and one or more selected high performance fibers. For example, the selected high performance fibers may be used in at least a first wrap about the elastic core and nylon-66 fibers in at least a second wrap. It may be advantageous for the second wrap to be in the opposite wrap direction from the first wrap. Examples of such stretch yarn constructions are provided in U.S. Pat. No. 5,529,545, European Pat. No. 637,704, and European Pat. No. 1,436,450, which are all hereby incorporated herein by reference. FIG. 4 illustrates such a stretch yarn. Referring to stretch yarn 45 in FIG. 4, elastic core 46 is first wrapped in a first direction with yarn 47 which may advantageously include PAS or PPS, and is second wrapped in the opposite direction with yarn 48 which may be of nylon.

The texturing of the transverse yarn may be achieved in the same manner as described above for the longitudinal yarn. In an embodiment of the invention, the degree of texturing of the transverse yarn may be substantially less than that of the longitudinal yarn. The elongation at 2 kg of the longitudinal yarn, for example, may be greater than about 50%, or greater than about 80%. The elongation at 2 kg of the transverse yarn may be in the range from about 1% to about 15%, or from 2% to about 10%. Higher stretch in the longitudinal direction is useful for manufacture of toothed belts by the flow through process, during which the fabric stretches from following the tensile member line to form the entire profile of the teeth. Less stretchy yarn in the transverse direction is sufficient for providing the above mentioned benefits of texturing in that direction. In an embodiment of the invention, the transverse yarns may consist essentially of textured multifilament nylon yarn, preferably nylon-66. The above mentioned fabric may also be used in a power transmission belt.

Figure 3:
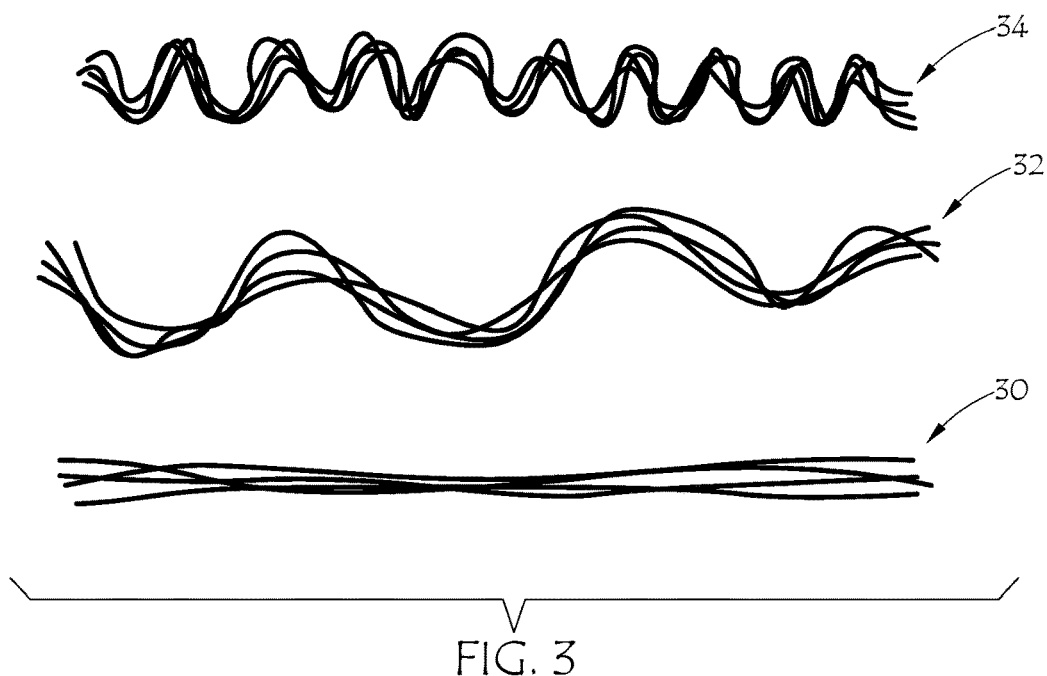
FIG. 3 is a representation of portions of yarns utilized in embodiments of the present invention.

By way of example, FIG. 3 shows a representative length of a representative longitudinal highly textured yarn, a transverse lightly textured yarn useful in an embodiment of the present invention, and a non-textured yarn. Referring to FIG. 3, highly textured yarn 34 exhibits an elongation of about 88% at 2 kg tension. Lightly textured transverse yarn 32 exhibits an elongation of about 3% at 2 kg tension. Elongation at break for non-textured yarn 30 is about 25% at about 100 kg, and for lightly textured yarn 32 is about 30% at 104 kg. Elongation at break for the highly textured yarn 34 is about 180% at 323 kg. The break strength is higher because yarn 34 has about three times more filaments than yarn 30 or 32.

The respective high performance yarns or fibers may be commingled, co-plied, or co-twisted at any stage of the yarn or cord manufacturing process with conventional yarns or fibers which may preferably be of nylon, or which may be of acrylic, polyester, cotton, and the like. It should also be noted that there may be blended at any ratio a third high-performance or heat-resistant yarn along with the first high-performance yarn and nylon. Staple yarns may also be used or a blended staple yarn containing fibers including PEEK, PPS, and/or others.

By nylon is meant any thermoplastic polyamide fiber including nylon-6, nylon-66, nylon-46, and the like. Nylon-66 is a preferred polyamide. Nylon-66 may moreover be of a high tenacity variety or medium or normal tenacity.

By aramid is meant a long chain synthetic polyamide having its amide linkages attached directly to two aromatic rings in either the para or meta position. In the present invention, use may be made, for example, of PPD-T, poly (p-benzamide), copoly(p-phenylene/3,4'-oxydiphenylene terephthalamide), or the like. By PPD-T is meant the homopolymer resulting from mole-for-mole polymerization of p-phenylene diamine and terephthaloyl chloride and, also, copolymers resulting from incorporation of small amounts of other diamines with the p-phenylene diamine and of small amounts of other diacid chlorides with the terephthaloyl chloride. Commercial aramid fibers suitable for the practice of this invention include those sold under the trademarks TEIJINCONEX, TECHNORA, and TWARON by Teijin Limited, and under the trademarks NOMEX, and KEVLAR by E.I. DuPont de Nemours and Company.

A suitable commercial LCP fiber is the liquid crystal polyester-polyarylate fiber sold under the trademark VECTRAN by Celanese Acetate LLC and Kuraray Co., Ltd. PBO is sold under the trademark ZYLON by Toyobo Co., Ltd. Polyester fibers include polyethylene terephthalate (PET) and polyethylene naphthalate (PEN). PEN is sold under the trademark PENTEX by Honeywell International Inc. PEN is also sold by Teijin Limited, INVISTA, and Hyosung Corporation.

Suitable fluoropolymers may include for example but are not limited to polytetrafluoroethylene polymer (PTFE), polytrifluoromonochloroethylene polymer (PTFCE), polyvinylidene fluoride polymer (PVDF), fluorinated ethylene polymer (FEP) and perfluoroalkoxy polymer (PFA).

Polyimide and/or polyamide-imide fibers ("PI"), especially high temperature polyimides, may be used. A suitable PI fiber may be P84, sold under that trade name by Inspec Fibres, a Degussa company. Polyacrylonitrile ("PAN") fibers are sold, for example, by Toyobo Co. Ltd. PAN fibers include fibers with a range of acrylic content, generally at least 85% acrylonitrile, and various comonomers, such as methyl methacrylate, vinyl acetate, and the like.

Polysulfonamide ("PSA") fiber is a kind of aromatic polyamide fiber having a main chain of benzene rings para-linked with $SO_2$ groups and amide linkages. PSA fiber is currently sold in staple form under the trade name Tanlon by Shanghai Tanlon Fiber Co., Ltd. The characteristics of PSA include high temperature resistance, excellent flame resistance, dimensional stability at high temp, and high chemical stability.

Polyketone fibers are formed from polymers having ketone bonds or groups in the main chain. For example, U.S. Pat. No. 5,130,408 describes a number of types or aromatic polyketones including polyetherketones (PEK), polyetheretherketones (PEEK), polyetherketoneketones (PEKK), and polyaryletherketones (PAEK) which may be advantageously used in the present invention. One example of a commercial PEEK material has a repeat unit of oxy-1, 4-phenyleneoxy-1, 4-phenylene-carbonyl-1, 4-phenylene which forms a linear aromatic semi-crystalline polymer with very high temperature resistance. A suitable PEEK fiber is sold under the trade name Zyex by Zyex Ltd.

Another useful polyketone fiber may be formed from polyketone polymer having an intrinsic viscosity of about 5.9 dl/g in which ethylene prepared by a conventional procedure is completely copolymerized with carbon monoxide and poly (1-oxotrimethylene). In general, useful polyolefin ketone (POK) fiber can be obtained by melt spinning or wet spinning as disclosed in U.S. Pat. No. 6,763,867 and references cited therein. It may be advantageous to use a polyolefin ketone fiber having a structure represented by the following formula: $\neg$—(CH2-CH2-CO)n-(R—CO)m- where, $1.05 >= (n+m)/n >= 1.00$, and R is an alkylene group having three or more carbons as described in U.S. Pat. No. 6,763,867. The POK fiber may advantageously be of an alternating polymer of carbon monoxide and ethylene as described in U.S. Pat. No. 6,818,728. All of the above types of polyketone fibers will be referred to as "PK" or polyketone herein and in the claims.

Table 1 lists a number of high performance fibers which may be advantageously applied in embodiments of the present invention, along with some typical properties. In the table, "−" means poor, "0" means fair, "+" means good, and "++" means excellent. Also in the table, "MR" is moisture regain; "m.p." is melting point; "HAS" is heat aged shrinkage; and "Eb" is elongation at break.

TABLE 1

| Polymer | PA 66 | PPS | PPS | meta-aramid | PI | PEEK | PEEK | PAN | PTFE | PSA |
|---|---|---|---|---|---|---|---|---|---|---|
| fiber type | Continuous | Continuous | Continuous | Continuous | Continuous | Continuous | Continuous | staple | Continuous | staple |
| Trade name | | Diofort | | | | | | | | Tanlon |
| Maker | | Diolen | Toyobo | | Inspec | generic | Zyex | Toyobo | Gore | Shanghai |
| filament size, dtex | | 4 | | | 0.6-8 | | | 0.9-8 | | 1.2-4 |
| tenacity, cN/tex | 79.5 | >52 | 40 | 40-45 | (35) | 20-40 | 62 | 60-70 | | >30 |
| Eb, % | 25 | 20-25 | 25 | | | | | 20 | 1.5-2 | |
| HAS, % | | <1 or 5 | 3.5 | | | | | 1.1 | 1.5-2 | |
| use temp ° C. continuous | 95 | 190 | 190 | 190 | (240) | 250 | 250 | 125 | 250 | 250 |
| Density | 1.14 | 1.35 | 1.35 | 1.38 | | | 1.3 | 1.18 | 2.18 | 1.42 |
| m.p. ° C. | 255 | 290 | 290 | | | | 334 | | | |
| MR, % | 4.5 | <0.02 | | 4-5 | (3) | 0.1 | | | 0 | 6.3 |
| resist to oxidation | 0 | 0 | 0 | + | (+) | 0 | 0 | | ++ | |
| resist to hydrolysis | − | ++ | ++ | 0 | (+) | ++ | ++ | | ++ | |
| resist to acid | 0 | ++ | ++ | 0 | (+) | + | + | | ++ | + |
| resist to alkalis | − | ++ | ++ | + | (0) | + | + | | ++ | 0 |

In the construction of a belt according to an embodiment of the invention, the generally flexible material or materials utilized in the overcord section 12 and teeth 16 should generally be compatible with one another and may be of the same or of different types of material. Any suitable and/or conventional elastomer, including both castable and non-castable elastomers, may be used as the overcord 12 and/or the teeth 16 (hereafter collectively, "the belt body portions") in this embodiment of the present invention. Examples of suitable castable elastomers include but are not limited to castable polyurethanes (including polyurethanes, polyurethane/ureas and polyureas), plastisols, organosols, liquid chloroprenes, liquid polysulfides, liquid rubbers, silicones, epoxides, urethanes, polyester based resins, polyether based resins, and the like, as well as blends of any two or more thereof. Polyurethane elastomers are generally preferred over other types of castable elastomers at present because of their favorable tensile strength and abrasion resistance and their satisfactory modulus and elasticity. Such polyurethanes may be prepared in any conventional manner, such as by compounding a polyurethane prepolymer with a chain extending agent, and optionally an amount of plasticizer or other ingredient if desired. Conventional chain extenders may be utilized, which are generally known to the art.

Non-castable elastomers useful as the belt body portions of such belts that would likely enjoy the benefits provided by the present invention include for example, chloroprene rubber (CR), acrylonitrile butadiene rubber (NBR), hydrogenated NBR (HNBR), styrene-butadiene rubber (SBR), alkylated chlorosulfonated polyethylene (ACSM), epichlorohydrin, butadiene rubber (BR), polyisoprene (including both natural rubber (NR) and synthetic polyisoprene) and ethylene-alpha-olefin elastomers exemplified by ethylene propylene diene terpolymer elastomer (EPDM), as well as blends or mixtures of any two or more of the foregoing. Most thermoplastic elastomers are also envisioned within this context. Continuous or long-length belts, for example formed by extruding thermoplastic elastomer onto cord and fabric and pressing onto a rotating mold, are also envisioned within this context.

Whether a castable or non-castable elastomer is utilized in the compositions to form the elastomeric portion(s) of the belt, such compositions may also generally include conventional additives in amounts generally suitable for use in the intended application. Thus for example, such composition may also include a reinforcing, partially reinforcing or non-reinforcing filler in amounts of from about 0 parts per hundred weight of rubber (phr) to about 500 phr; alternatively of from about 20 phr to about 250 phr; one or more plasticizers in amounts of from about 0 phr to about 30 phr, or alternatively of from about 1 phr to about 25 phr; one or more vulcanization agents or curatives, including sulfur, free-radical-generating materials such as peroxide and ionizing radiation, etc., in cure-effective amounts of, e.g., from about 0 phr to about 30 phr for example; one or more co-agents or activators in amounts of from about 0 to about 100 phr; and one or more antidegradants in amounts of from about 0 phr to about 15 phr etc. In one embodiment of the present invention at least one of the overcord portion 12 and the teeth 16 of the belt 10 are formed of a suitable hydrogenated acrylonitrile butadiene rubber (HNBR) composition such as that set forth for example in U.S. Pat. No. 6,358,171, to Whitfield, the disclosure of which with regard to such elastomer compositions is hereby incorporated by reference; or a suitable polyurethane/urea composition such as that set forth for example in WO09602584 to Wu et al., the disclosure of which with regard to such elastomer compositions is hereby incorporated by reference.

The elastomer overcord section 12 is preferably provided with a reinforcing tensile layer or a plurality of tensile members, any number of which are well known to the art, such as the longitudinally extending and spaced tensile cords 18 as shown. These tensile cord 18 may consist of one or more strands of any suitable strain-resistant material including but not limited to polyamide cord, aramid cord, glass fiber cord, carbon fiber cord, polyester cord, or filament wire cord, or hybrids or combinations thereof, typically disposed as one or more embedded helically-wound cords as shown. The tensile members may be pre-stressed or impregnated or coated with a suitable adhesive or process-aid material, particularly where a non-castable elastomer such as HNBR is employed as or in the belt body portion.

The flexible materials forming the teeth 16 and/or overcord 12 portions may optionally be loaded with discontinuous fibers, by the incorporation within the elastomer composition while generally in the un-vulcanized state of any suitable and/or conventional material including staple fiber, pulp fiber or chopped fiber reinforcement materials. Suitable materials for fiber loading include for example aramids, including meta- and para-aramids, such as those available by DuPont Chemical Co. under the trademark, KEVLAR; nylon, polyester, acrylic, carbon, and cotton. Fiber loading may be at any level suitable for the application, such as that disclosed in U.S. Pat. No. 6,358,171, the disclosure of which with regard to such fiber loading types and levels is hereby incorporated by reference; and may include in the case of toothed belts orientation of at least a substantial number of the fibers in a direction perpendicular to the travel of the belt. One or more such fibers may moreover protrude from the elastomeric material.

The generally wear-resistant fabric layer 14, or fabric 20 intimately fits along the power transmitting surface of the belt 10, which is in the case of the toothed belt illustrated in FIG. 1, along at least the alternating teeth 16 and land portions of the belt 10 as shown, to form a cover therefor. The fabric utilized may be of any desired configuration such as a conventional weave consisting of warp and weft threads at any desired angle, including such weaves as twill-, square- or matte woven 1×1, −1×2, −1×3, −2×1, −2×2, −2×3, −3×1, −3×2, or −3×3 fabrics; or may comprise pick cords, or be of a knitted or braided configuration, or of a nonwoven configuration, or the like. More than one ply of fabric may be employed, including combinations of different types of fabrics. If desired, the fabric may be cut on a bias as is well known in the art so that the strands form an angle with the direction of travel of the belt. Conventional fibers may be employed such as cotton, polyester, polyamide, aromatic polyamide, hemp, jute, fiberglass and various other natural and synthetic fibers.

In an embodiment of the invention, the fabric layer 14 comprises a bias-cut 2×2-twill or -matte woven fabric. At least one of the warp or weft yarns may moreover be scoured, heat-set, textured, twisted, and/or otherwise processed as are each well known in the art. Optionally, the surface of the belt remote from its power transmitting surface may also include a fabric element as herein described, (hereafter, "back fabric") which back fabric may be either of the same type and form as that utilized along tooth portion 17 and land portion 19 of the belt 10, or of a different type or form.

In an embodiment of the present invention an amount of internal lubricating agent may be utilized upon and/or within the fabric cover element. A lubricant may be included in a fabric treatment, such as RFL, or applied in a separate lubricating treatment. Examples of use of lubricants for belt fabrics are disclosed for example in U.S. Pat. No. 7,042,021 and U.S. Publication No. 2007/249451, the contents of which are hereby incorporated herein by reference.

Examples may be built and tested to demonstrate the usefulness and advantages of the embodiments of the present invention. Descriptions of the belt tests are as follows:

Max force test (air environment) uses a 120-tooth belt, 30-mm wide tested on ultra high load diesel motored engine. The engine speed is varied throughout the course of the test, to exert the maximum load on the belt. The test is conducted at ambient temperature.

High temperature test (air environment) uses a 141-tooth belt, 15-mm wide tested on high load diesel motored engine. The engine is maintained at a constant speed of 4000 rpm. Flow of fuel to the injection pump is regulated at 480 ml/min. The test is conducted in a hotbox, with heat input controlled such that the belt temperature is 200° C.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A woven stretch fabric for reinforcing a power transmission belt comprising textured staple fibers of polyarylene sulfide.

2. The fabric of claim 1 comprising warp and weft threads, wherein at least one of said warp and weft threads comprises said staple fibers of polyarylene sulfide in the form of a textured staple yarn of poly p-phenylene sulfide fibers.

3. The fabric of claim 2 wherein said poly p-phenylene sulfide fibers are present in the weft and textured to have at least 50% elongation at 2 kg tension, and said warp comprises textured polyamide fiber.

4. The fabric of claim 3 wherein said fabric further comprises as said textured polyamide fiber nylon-66 fibers textured to have from 1 to 20% elongation at 2 kg tension, and wherein said fabric has no elastic core thread.

5. A power transmission belt having an elastomeric body, a tensile member embedded within said body, a pulley contact surface, and a back surface; comprising on at least one of said surfaces a woven stretch fabric comprising textured staple fibers of polyarylene sulfide.

6. The belt of claim 5 in the form of a toothed belt having teeth on said pulley contact surface and with said fabric covering said teeth.

7. The belt of claim 5 wherein said fabric is woven with transverse and longitudinal threads with respect to their orientation in the belt, and wherein said transverse threads comprise nylon-66 fibers, and said longitudinal threads comprise both textured nylon-66 fibers and said polyarylene sulfide fibers in the form of poly p-phenylene sulfide fibers.

8. The belt of claim 7 wherein said transverse threads are textured to achieve from 1% to 20% elongation at 2 kg tension, and said longitudinal threads are textured to achieve at least 50% elongation at 2 kg tension.

9. The belt of claim 7 wherein said longitudinal threads comprise no elastic core.

10. A power transmission belt reinforced with a woven stretch fabric comprising longitudinal yarns oriented in the belt longitudinal direction that are capable of stretching at least about 50% and transverse yarns oriented in the belt transverse direction;

with the longitudinal yarns comprising polyamide fibers and staple fibers of polyarylene sulfide; and the transverse yarns consisting of textured multifilament polyamide yarn.

11. The belt of claim 10 wherein the longitudinal yarns are textured to achieve said stretching capability.

12. The belt of claim 10 wherein the transverse yarns are textured to achieve the capability of stretching in the range of from about 1% to about 20%.

13. The belt of claim 12 in the form of a toothed power transmission belt.

14. The belt of claim 10 wherein the transverse yarns are textured to achieve the capability of stretching in the range of from about 2% to about 10% under 2 kg tension, and said longitudinal yarns are capable of stretching at least about 80%.

* * * * *